US 8,836,906 B2

(12) United States Patent
Kurokawa et al.

(10) Patent No.: US 8,836,906 B2
(45) Date of Patent: Sep. 16, 2014

(54) DISPLAY DEVICE WITH LIGHT RECEIVING ELEMENT UNDER TRANSPARENT SPACER AND MANUFACTURING METHOD THEREFOR

(75) Inventors: Yoshiyuki Kurokawa, Kanagawa (JP); Takayuki Ikeda, Kanagawa (JP); Tetsuji Ishitani, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 384 days.

(21) Appl. No.: 13/090,299

(22) Filed: Apr. 20, 2011

(65) Prior Publication Data

US 2011/0261308 A1    Oct. 27, 2011

(30) Foreign Application Priority Data

Apr. 23, 2010   (JP) ................. 2010-099491
Apr. 23, 2010   (JP) ................. 2010-099556

(51) Int. Cl.
*G02F 1/1339*    (2006.01)
*G02F 1/1333*    (2006.01)
*G02F 1/135*    (2006.01)

(52) U.S. Cl.
USPC ............ 349/155; 349/156; 349/138; 349/25; 349/26; 349/27

(58) Field of Classification Search
USPC ............ 349/28, 42–47, 1, 2, 25–27, 155–156
See application file for complete search history.

(56) References Cited

U.S. PATENT DOCUMENTS

| | | | |
|---|---|---|---|
| 5,298,455 A * | 3/1994 | Arai et al. | 438/59 |
| 6,243,069 B1 * | 6/2001 | Ogawa et al. | 345/102 |
| 6,724,012 B2 * | 4/2004 | Kimura | 257/72 |
| 6,747,638 B2 | 6/2004 | Yamazaki et al. | |
| 7,161,185 B2 * | 1/2007 | Yamazaki et al. | 257/88 |
| 7,525,523 B2 | 4/2009 | Yamazaki et al. | |
| 7,674,650 B2 | 3/2010 | Akimoto et al. | |

(Continued)

FOREIGN PATENT DOCUMENTS

| | | | | |
|---|---|---|---|---|
| JP | 2000298266 A | * | 10/2000 | ............ G02F 1/1334 |
| JP | 2001-292276 | | 10/2001 | |
| JP | 2005-010690 | | 1/2005 | |
| JP | 2009-098795 | | 5/2009 | |

OTHER PUBLICATIONS

Minoura, et al., "P-149: Super Reflective Color LCDs Being Able to Display Moving Images without Polarizers", SID Digest, 2006, SID International Symposium Digest of Technical Papers, Jun. 6, 2006, vol. 37, No. 1, pp. 769-772.

*Primary Examiner* — Hoan C Nguyen (74) *Attorney, Agent, or Firm* — Nixon Peabody LLP; Jeffrey L. Costellia (57) ABSTRACT

An object is to provide a display device which has high visibility and has a touch recognition function with a high degree of accuracy, by combining a liquid crystal layer where liquid crystals are dispersed in a polymer and a light emitting element. In a display device using a liquid crystal layer where liquid crystals are dispersed in a polymer, a light-transmitting spacer is provided so as to overlap with a light receiving element which has a touch recognition function. The light-transmitting spacer can prevent light incident on the light receiving element from being dispersed by the liquid crystals, while maintaining a cell gap in the liquid crystal layer, and thus achieve a touch recognition function with a high degree of accuracy with high visibility.

16 Claims, 6 Drawing Sheets

(56) References Cited

U.S. PATENT DOCUMENTS

| | | |
|---|---|---|
| 8,456,459 B2 | 6/2013 | Yamazaki et al. |
| 2002/0011972 A1 | 1/2002 | Yamazaki et al. |
| 2004/0217928 A1 | 11/2004 | Yamazaki et al. |
| 2007/0108446 A1 | 5/2007 | Akimoto |
| 2009/0295769 A1 | 12/2009 | Yamazaki et al. |
| 2010/0117991 A1 | 5/2010 | Koyama et al. |
| 2011/0109591 A1 | 5/2011 | Kurokawa et al. |
| 2011/0109592 A1 | 5/2011 | Kurokawa et al. |
| 2013/0207125 A1 | 8/2013 | Yamazaki et al. |

\* cited by examiner

DISPLAY DEVICE WITH LIGHT RECEIVING ELEMENT UNDER TRANSPARENT SPACER AND MANUFACTURING METHOD THEREFOR

BACKGROUND OF THE INVENTION

1. Field of the Invention

The present invention relates to a liquid crystal display device including a light receiving element, and a method for manufacturing a liquid crystal display device including a light receiving element.

2. Description of the Related Art

As display devices which have been reduced in thickness and weight (so-called flat panel displays), a liquid crystal display device including a liquid crystal element, a light-emitting device including a self light emitting element a field emission display (FED), etc. have been competitively developed.

In addition, the liquid crystal display device uses a number of optical elements such as a polarization and a backlight, and thus also has problems to be reduced in terms of cost and power consumption.

As a countermeasure against the problem described above, liquid crystal display devices have been researched which use a polymer dispersed liquid crystal (PDLC) or, a polymer network liquid crystal (PNLC) to produce displays with the use of a light scattering phenomenon caused by liquid crystals, without the need for a polarization plate or a backlight (for example, see Non-Patent Document 1). The use of the display device can achieve high visibility which is comparable to papers on which pictures and characters are written and drawn.

In addition, Patent Document 1 discloses a liquid crystal display device which has an input function using a sensor for detecting light. Specifically, the liquid crystal display device has a switching element and a light receiving element on a substrate. This display device can recognize a contacting or approaching object to be detected by detecting light. The display device is provided with a touch recognition function.

REFERENCES

Non-Patent Document

[Non-Patent Document 1] M. Minoura et al., SID 06 DIGEST, pp. 769-772

Patent Document

[Patent Document 1] Japanese Published Patent Application No. 2005-10690

SUMMARY OF THE INVENTION

When a polymer dispersed liquid crystal, a polymer network liquid crystal, or the like is combined with a light receiving element, a display device can be provided which has high visibility and has a touch recognition function.

However, since the liquid crystal layer scatters light, there is a possibility that the light receiving element mounted will have difficulty detecting light. For example, in the case of the display device using the liquid crystal layer mentioned above, the transmission may be 40% or less for visible light (wavelength: 380 nm to 780 nm). Therefore, in connection with the display device described above, any display device has not been achieved which uses a light receiving element to carry out touch recognition.

Therefore, an object of the present invention is to provide a display device which has high visibility and a touch recognition function, in such a way that the liquid crystal layer is used to effectively carry out light detection in the light receiving element.

In addition, the detection sensitivity of the light receiving element is increased as the amount of incident light increases. Another object of the present invention is to achieve a liquid crystal display device for producing displays with the use of a light scattering phenomenon caused by liquid crystals, in which a light-receiving element has a high degree of light detection accuracy without any liquid crystal element blocking light incident on the light receiving element.

The present invention provides a display device in which light detection is carried out by a light receiving element with the use of a polymer dispersed liquid crystal, a polymer network liquid crystal, or the like. Furthermore, the display device has a pixel section which includes: a display section including a pixel electrode, a common electrode, and a liquid crystal element including a liquid crystal layer; and a sensor section including a light receiving element.

In the display section, the liquid crystal layer has liquid crystals dispersed in a polymer. The refractive index of the liquid crystal is controlled with a voltage to scatter or transmit incident light, thereby producing a display.

For example, a polymer dispersed liquid crystal (PDLC) or a polymer network liquid crystal (PNLC) is used for the liquid crystal layer. The polymer dispersed liquid crystal and the polymer network liquid crystal produce white displays (referred to as bright displays) with the use of a light scattering phenomenon caused by the liquid crystal.

In the case of applying no voltage between the pixel electrode and the common electrode of the liquid crystal element (also referred to as an OFF state), the liquid crystals dispersed in the polymer are oriented in a random direction to cause a difference between the refractive index of the polymer and the refractive index of the liquid crystal molecule, and incident light is thus scattered by the liquid crystals to make the liquid crystal layer opaque and clouded. Therefore, the display which can be confirmed from the visual recognition will be also a white display.

On the other hand, in the case of applying a voltage between the pixel electrode and the common electrode (also referred to as an ON state), an electric field is formed in the liquid crystal layer, and the liquid crystal molecules in the liquid crystals are oriented in the direction of the electric field such that the refractive index of the polymer corresponds with the refractive index in the short axis of the liquid crystal molecules. Thus, incident light thus transmits through the liquid crystal layer without being scattered by the liquid crystals. Therefore, the liquid crystal layer is made transparent by transmission of light. When the liquid crystal layer is adapted to have a light-transmitting property, the display which can be confirmed from a viewer side (referred to as the visual recognition side) on the basis of the liquid crystal layer depends on the material provided on the element side of the liquid crystal layer. Therefore, when a coloring layer is provided on the side with the light receiving element formed (the side opposite to the visual recognition side, referred to as an element side) on the basis of the liquid crystal layer, the coloring layer can be recognized visually. When a black layer is used as the coloring layer, the pixels are adapted to display a black color in the display surface which can be confirmed on the visual recognition side, thereby allowing a black display (referred to as a dark display) to be produced.

The black layer may be placed so as to be able to be recognized visually and to produce a color display when the liquid crystal layer is adapted to have a light-transmitting property. Therefore, in the case of a reflective pixel electrode, the black layer may be provided between the pixel electrode and the liquid crystal layer (on the visual recognition side). In the case of a light-transmitting pixel electrode, the black layer can be provided under the pixel electrode (on the side opposite to the visual recognition side), and an interlayer film or a structure provided under the pixel electrode can also serve as a black layer. The placement of the black layer can provide a liquid crystal display device which produce white and black (monochrome) displays.

In addition, when a coloring layer of other color, such as a red layer, a green layer, or a blue layer, is used in place of the black layer, the color can be displayed. Therefore, the selection of multiple colors for the coloring layer can also provide a liquid crystal display device for full-color display.

On the other hand, the display device has a feature that the light receiving element of a photosensor is provided under a light-transmitting spacer in the sensor section. It is to be noted that the light-transmitting spacer is provided in the same layer as the liquid crystal layer at least in the display section, to maintain a cell gap in the display section. In addition, in this specification, the thickness of a cell gap refers to a maximum for the thickness (film thickness) of the liquid crystal layer.

An embodiment of the present invention disclosed in the specification is a display device which has a pixel section including a display section and a sensor section, where the display section includes a liquid crystal layer where liquid crystals are dispersed in a polymer, and the sensor section includes a light receiving element and a light-transmitting spacer overlapping with the light receiving element.

Another embodiment of the present invention disclosed in the specification is a display device which has a pixel section including a display section and a sensor section, where the display section includes a liquid crystal layer where liquid crystals are dispersed in a polymer, the sensor section includes a light receiving element and a light-transmitting spacer overlapping with the light receiving element, and the spacer maintains a cell gap of the liquid crystal layer.

Another embodiment of the present invention disclosed in the specification is a display device which has a pixel section including a display section and a sensor section, where the display section includes a liquid crystal layer where liquid crystals are dispersed in a polymer and a coloring layer on an element side with the liquid crystal layer interposed therebetween, and the sensor section includes a light receiving element and a light-transmitting spacer overlapping with the light receiving element.

Another embodiment of the present invention disclosed in the specification is a display device which has a pixel section including a display section and a sensor section, where the display section includes a liquid crystal layer where liquid crystals are dispersed in a polymer and a coloring layer on an element side with the liquid crystal layer interposed therebetween, the sensor section includes a light receiving element and a light-transmitting spacer overlapping with the light receiving element, and the spacer maintains a cell gap of the liquid crystal layer.

In the embodiment of the present invention disclosed in the specification, the liquid crystal layer includes a polymer dispersed liquid crystal or a polymer network liquid crystal.

In the embodiment of the present invention disclosed in the specification, the display section comprises a transistor on a visible recognition side with a liquid crystal layer interposed.

In the embodiment of the present invention disclosed in the specification, the coloring layer is located between the liquid crystal layer and the transistor.

Effects of the Invention

The use of the liquid crystal layer where liquid crystals are dispersed in the polymer allows light detection to be carried out effectively with the use of a photosensor, and a display device can be provided which has high visibility and has a touch recognition function.

In addition, the formation of the light-transmitting spacer over the light receiving section of the light receiving element can ensure a sufficient amount of light incident on the light receiving element as long as the light has wavelengths in a light region which transmits through the spacer, and increase the light detection accuracy of the light receiving element in a liquid crystal display device which produces displays with the use of a light scattering phenomenon caused by liquid crystals.

DETAILED DESCRIPTION OF THE INVENTION

Embodiments of the present invention will be described in detail with reference to the accompanied drawings. However, the present invention is not limited to the following description, and it will be easily understood by those skilled in the art that various changes can be made to the embodiment and details thereof without departing from the spirit and the scope of the present invention. Accordingly, the present invention is not to be construed as being limited to what is described in the following embodiments. In the structures to be described below, the same sections or sections having similar functions are denoted by the same reference numerals in common among different drawings, and repeated explanations thereof will not be omitted.

(Embodiment 1)

In this embodiment, an example of the display device will be described.

Figure 1A:
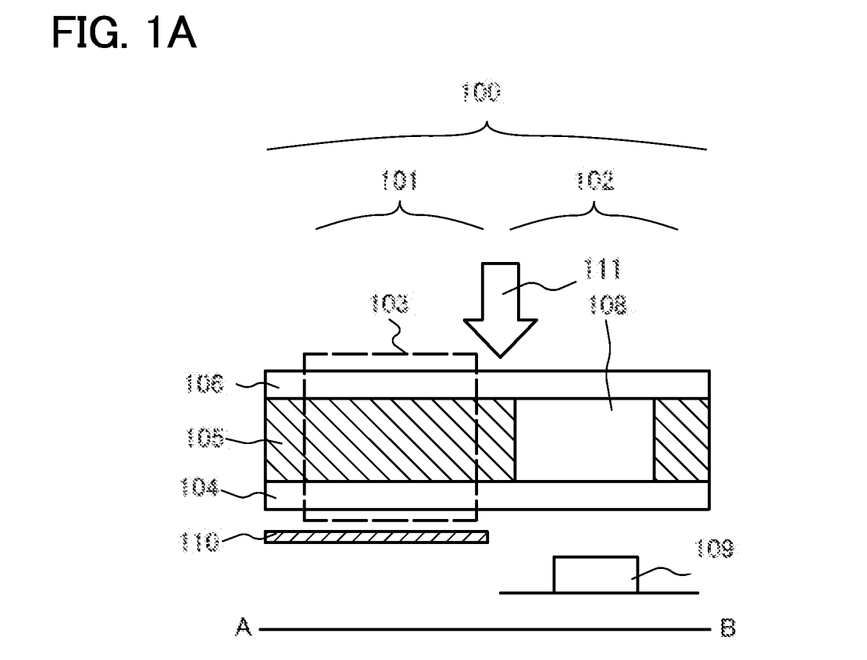
FIGS. 1A and 1B are diagrams illustrating a structural example of a display device.
Figure 1B:
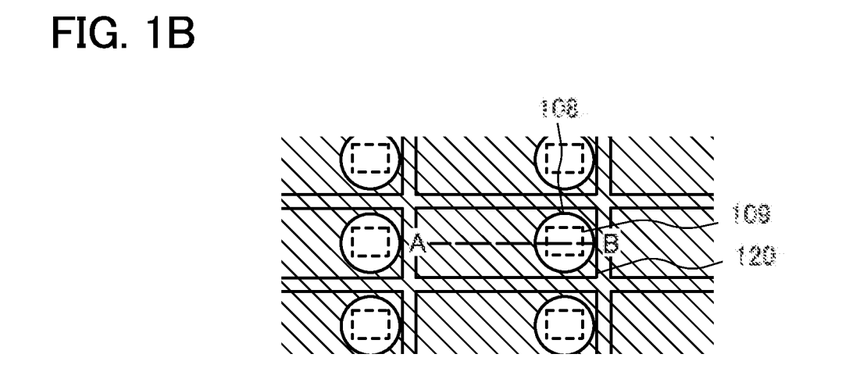

FIGS. 1A and 1B illustrate an example of a pixel section of a display device.

FIG. 1A shows a cross-sectional view of the pixel section, whereas FIG. 1B shows a top view thereof.

A pixel section 100 has a plurality of pixels 120, each also including a display section 101 and a sensor section 102. It is to be noted that the sensor section is not necessarily provided for each pixel. A number of pixels may share one sensor section. For example, when another layout is used as shown in FIG. 2, four pixels can share one sensor section 102.

As shown in FIG. 1A, the display section 101 includes a liquid crystal element 103 and a black layer 110. It is to be noted that while the black layer 110 is provided in this case, the use of a coloring layer in place of the black layer can provide a display of the color. In addition, when a full-color display is desired, multiple color elements (for example, red, blue, green, white, black, yellow, magenta, cyan element, etc.) may be used. In this case, the pixels 120 in FIG. 1B and FIG. 2 can be grouped into the multiple color elements.

Figure 2:
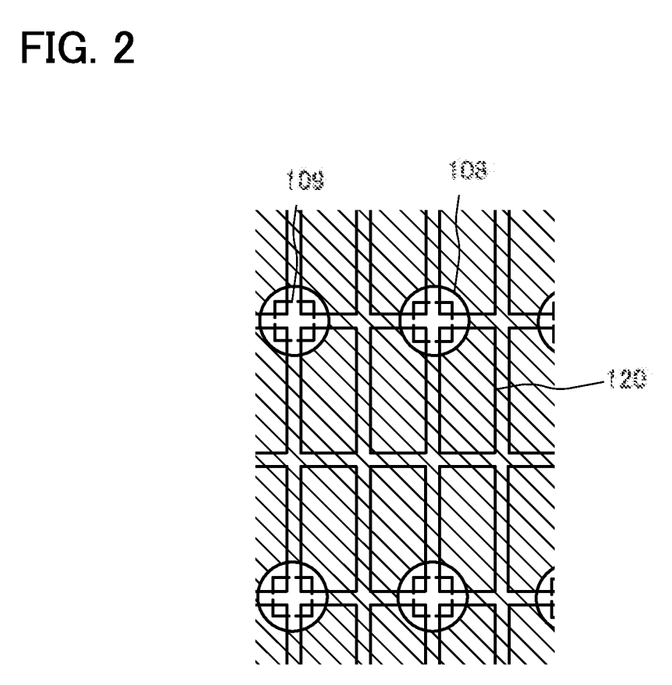
FIG. 2 is a diagram illustrating a structural example of the display device.

In addition, while the pixels 120 have a uniform area in FIG. 1B and FIG. 2, an area of the pixels may be different for each color elements. The area varied for each color element can adjust the balance of the luminous efficiency of display elements for each color.

The liquid crystal element 103 includes a pixel electrode 104 and a common electrode 106, and a liquid crystal layer 105 provided between the electrodes. More specifically, the liquid crystal element 103 has a structure of the pixel electrode 104, liquid crystal layer 105, and common electrode 106 stacked sequentially. The liquid crystal element 103 functions as a display element.

The liquid crystal layer 105 uses a liquid crystal layer where liquid crystals are dispersed in a polymer, which has the liquid crystals dispersed in the polymer forming a polymer network.

Then, when any voltage is not applied between the pixel electrode 104 and the common electrode 106 (also referred to an OFF state), the liquid crystals dispersed in the polymer are oriented in a random direction. Then, because of the difference between the refractive index of the polymer and the refractive index of the liquid crystal molecules, incident light is scattered by the liquid crystals so that the liquid crystal layer 105 is clouded without transmitting light. Therefore, the display which can be confirmed from the visual recognition side (the common electrode 106 side) will be also a white display (bright display).

Alternatively, when a voltage is applied to between the pixel electrode 104 and the common electrode 106 (also referred to as an ON-state), an electric field is formed in the liquid crystal layer 105, and the liquid crystal molecules are oriented in the direction of the electric field. Then, the refractive index of the polymer corresponds with the refractive index in the short axis of the liquid crystal molecules, and incident light thus transmits through the liquid crystal layer 105 without being scattered at the interface between the liquid crystals and the polymer. Therefore, the liquid crystal layer 105 is adapted to have a light-transmitting property. In that case, the display which can be confirmed from the visual recognition side depends on the material provided on the element side of the liquid crystal layer 105. Therefore, when the black layer 110 is provided on the side opposite to the visual recognition side of the liquid crystal layer 105 (the pixel electrode 104 side), the black layer 110 can be recognized visually. Therefore, the display which can be confirmed from the visual recognition side will be also a black display (dark display).

On the other hand, the sensor section 102 includes a light-transmitting spacer 108 and a light-receiving element 109. The light-receiving element 109 is provided under the spacer 108. It is to be noted that what is required is that at least a section of the light-receiving element 109 for receiving light (also referred to as a light-receiving section) is provided under the spacer 108. The provision under the spacer can increase the amount of light 111 incident to the light-receiving element 109.

In this case, the spacer 108 in the sensor section and the liquid crystal layer 105 in the display section are formed in the same layer. In addition, in the display section, the common electrode may extend to the sensor section because the common electrode has a light-transmitting property. It is to be noted that the pixel electrode may be formed from a reflective conductive layer, or a configuration may be employed in which a light-transmitting pixel electrode is formed whereas a reflective layer is stacked so as to cover the display section. However, in the case of forming the pixel electrode from a reflective conductive layer, the pixel electrode is provided only in the display section, without covering the sensor section.

More specifically, the placement of the light-receiving element under the light-transmitting spacer makes a sufficient amount of light incident on the light-receiving element without being blocked by the liquid crystal layer. In the liquid crystal layer where liquid crystals are dispersed in the polymer, the transmission may be 40% or less, for example, for visible light (wavelength: 380 nm to 780 nm), and it has been thus difficult to ensure a sufficient amount of light. However, the use of the configuration according to this embodiment allows light detection to be carried out effectively even in the case of visible light, and thus allows a display device to be provided which has high visibility and has a touch recognition function depending on the amount of light obtained by the light-receiving element.

On the other hand, infra-red light can be transmitted through the liquid crystal layer where liquid crystals are dispersed in the polymer. Therefore, the light-receiving element can detect the infra-red light by having light-sensitivity in a wavelength range of the infra-red light even though the light-receiving element is overlapped with the liquid crystal layer. Then, the display device captures an image of an object by the infra-red light detected by the light-receiving element.

In addition, the light (infra-red light) incident to the display device does not reach the light-receiving element when the light is blocked by an object. In this case, the display device captures an image of the object by recognizing a shadow due to the object by the light-receiving element.

Further, it is possible to apply the display device to, for example, electronic books (electronic papers), and in such a case, the electronic books can achieve comparable visibility to papers on which pictures and characters are written and drawn.

In addition, since it is possible to read images with the use of the touch recognition function, the display device can be provided with a scanner function. In that case, images can be read with a higher degree of accuracy by providing a light for irradiating an object to be detected with light.

This embodiment can be implemented in combination with any of the other embodiments as appropriate.

(Embodiment 2)

Figure 3A:
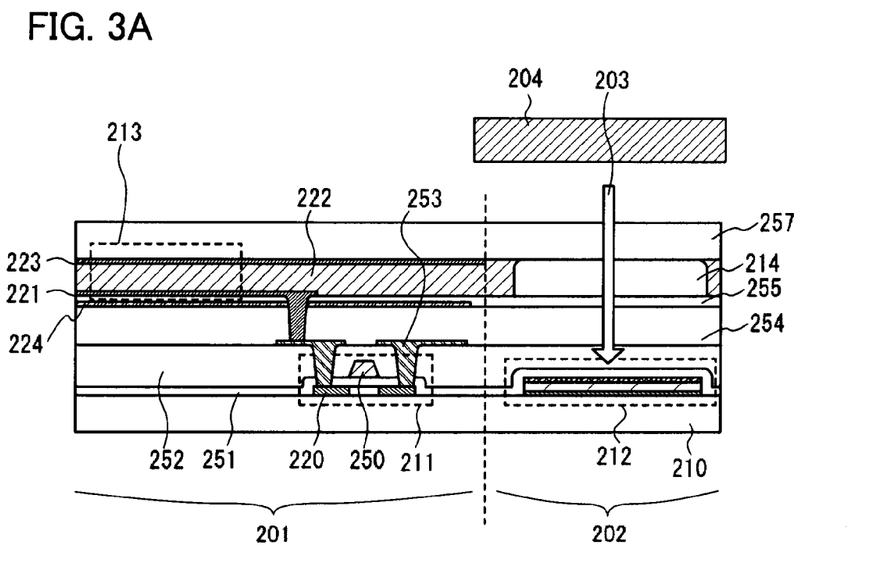
FIGS. 3A and 3B are diagrams illustrating a structural example of a display device.
Figure 3B:
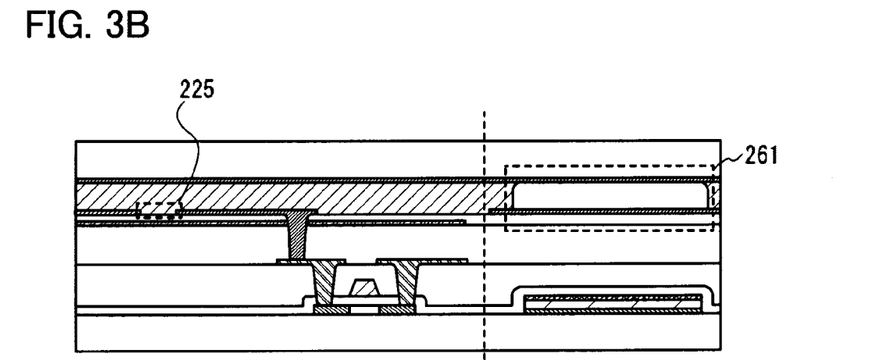

FIGS. 3A and 3B are examples of cross-sectional views in a pixel section of a display device.

The pixel section includes a display section 201 and a sensor section 202. FIG. 3A shows the sensor section 202 in which light 203 (such as outside light) from an object to be detected 204 is incident on a light receiving element 212. As the object to be detected 204, fingers, papers, etc. can be used.

On an insulator 210, a transistor 211, a light receiving element 212, and a liquid crystal element 213 are provided, and a light-transmitting spacer 214 is provided over the light receiving element.

As the insulator 210, a glass substrate, a quartz substrate, a plastic substrate, etc. can be used. These substrates may be used by being provided with an insulating layer thereon, such as a single or stacked layer of a silicon oxide film and/or a silicon nitride film. The use of an inexpensive glass substrate can reduce the cost.

While a thin film transistor which has a top-gate structure is used as the transistor 211 in FIGS. 3A and 3B, the transistor 211 is not limited to this type of thin film transistor. As the transistor, a thin film transistor which has a bottom-gate structure may be used, and a channel-etch type or a channel-stop type can be adopted.

In addition, for a semiconductor layer 220 of the transistor 211, for example, polycrystalline silicon can be used. However, the semiconductor layer 220 is not limited to this polycrystalline silicon, and amorphous silicon, microcrystalline silicon, single crystalline silicon, an organic semiconductor such as pentacene, an oxide semiconductor, or the like can be used for the semiconductor layer 220.

When a single crystalline silicon is used as the semiconductor layer 220, the single crystalline silicon can be formed by bonding the insulator 210 to a single crystalline silicon substrate with a damaged region provided at a predetermined depth from the surface, and separating the single crystal silicon substrate at the damaged region. The use of the single crystalline silicon can provide a transistor with high field-effect mobility.

Alternatively, when an oxide semiconductor is used as the semiconductor layer 220, a composite oxide of elements selected from indium, gallium, aluminum, zinc, and tin can be used for the oxide semiconductor. The use of the oxide semiconductor can provide a transistor with an extremely low OFF current.

Figure 4A:
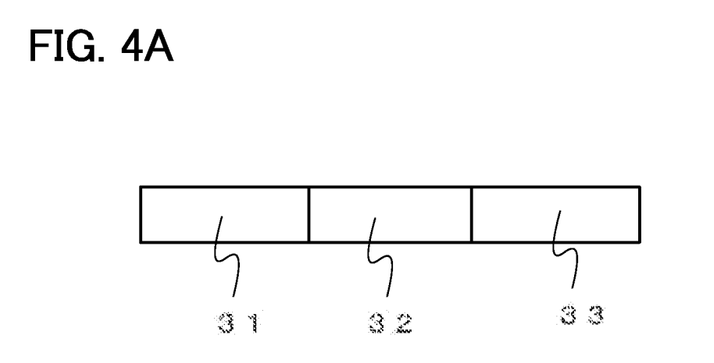
FIGS. 4A to 4C are diagrams for explaining examples of a light receiving element.
Figure 4B:
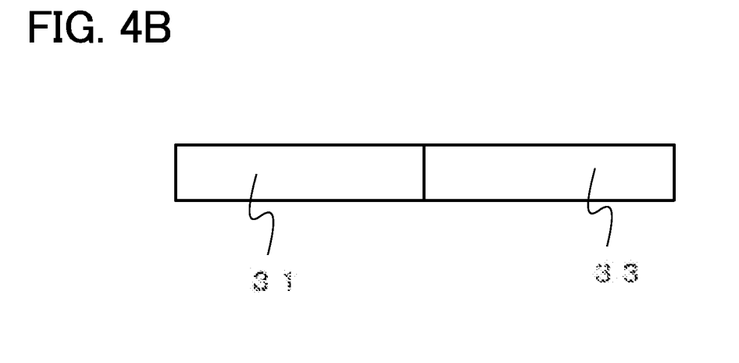
Figure 4C:
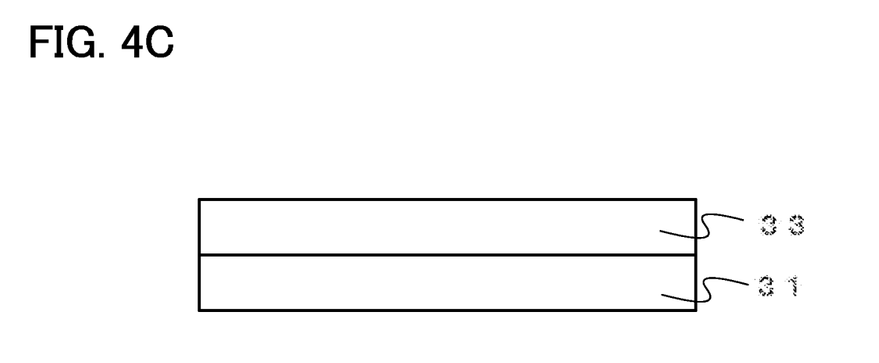

While a vertical junction pin diode is used as the light receiving element 212, the light receiving element 212 is not limited to this vertical junction pin diode. The pin diode may be of a horizontal junction type (FIG. 4A). The horizontal junction diode is formed in such a way that a p-type layer 31, an i-type layer 32, and an n-type layer 33 are formed in a semiconductor film by ion doping or the like. The vertical junction diode is formed in such a way that the p-type layer 31 is formed from a p-type semiconductor film, the i-type layer 32 is formed from an i-type semiconductor film, and the n-type layer 33 is formed from an n-type semiconductor film. It is also acceptable that the n-type layer 33 is formed, the i-type layer 32 is formed, and the p-type layer 31 is formed in the reverse order. Each of the p-type layer 31 and the n-type layer 33 is provided with an extracting electrode (not shown). In addition, a pn diode may be used as the light receiving element 212, and may be likewise a horizontal junction type (FIG. 4B) or a vertical junction type (FIG. 4C). In addition, a phototransistor or the like may be used. It is to be noted that the respective semiconductor layers of the light receiving element 212 may be formed with the use of microcrystalline silicon, polycrystalline silicon, single crystalline silicon, or the like.

The light-transmitting spacer 214 is provided over at least a light receiving section of the light receiving element 212. The spacer 214 is preferably provided so as to cover the light receiving section of the light receiving element 212. When the spacer 214 is provided so as to cover the light receiving section, the light receiving element 212 can receive the light 203 effectively without being blocked by the liquid crystal layer 222.

The spacer 214 can be formed from an organic material and an inorganic material. Typically, a visible light curable resin, an ultraviolet curable resin, or a thermosetting resin is preferably used. For example, an acrylic resin, an epoxy resin, an amine resin, etc. can be used. It is to be noted that the spacer may have a stacked structure of multiple thin films.

In addition, the cell gap referring to the thickness of the liquid crystal layer 222 may be 5 µm or more and 30 µm or less, and the spacer 214 may be formed appropriately to have such a size that can maintain the cell gap.

The liquid crystal element 213 includes a pixel electrode 221 and a common electrode 223 as well as a liquid crystal layer 222 provided between the electrodes. In addition, a black layer 224 is provided under the pixel electrode 221, and the pixel electrode 221 and the common electrode 223 are formed from a light-transmitting material. It is to be noted that when a light-transmitting material is used for the pixel electrode and the common electrode, the pixel electrode and the common electrode may extend to the sensor section as in the case of a spacer section 261 shown in FIG. 3B. However, even in that case, the black layer 224 is formed only in the display section. In addition, when the black layer 224 is provided so as to overlap with the transistor 211, the transistor 211 can be prevented from being optically degraded.

When the liquid crystal element 213 in an OFF state makes the liquid crystal layer 222 in a light-blocking state, the light 203 is scattered by the liquid crystal layer 222 to produce a white display.

In addition, when the liquid crystal element 213 in an ON state makes the liquid crystal layer 222 in a light-transmitting state, the light 203 transmits through the liquid crystal element 213 so that the black layer 224 located under the pixel electrode 221 can be recognized visually. It is to be noted that in order to improve the visibility of the black layer 224, the pixel electrode may be provided with an opening 225 as shown in FIG. 3B. In the case of providing the opening 225, the pixel electrode 221 may be formed from a light-blocking material. In addition, when a black display is possible by absorption or reflection of light in the pixel electrode 221, it is not necessary to provide the black layer 224. It is to be noted that when the pixel electrode 221 has no light-transmitting property, the pixel electrode 221 is formed only in the display section.

Next, an example of a method for manufacturing the liquid crystal display device shown in FIGS. 3A and 3B will be described.

First, the thin film transistor 211 and the light receiving element 212 are prepared on the insulator 210, where the thin film transistor 211 has a top-gate structure including a gate electrode 250, a gate insulating film 251, and an oxide semiconductor layer as the semiconductor layer 220. It is to be noted that the semiconductor layer 220 of the thin film transistor 211 and a semiconductor layer of the light receiving element 212 may be prepared in accordance with the same step.

In addition, the thin film transistor 211 can be an n-type thin film transistor or a p-type thin film transistor. Further, in the step of providing the thin film transistor 211 with n-type or p-type impurities, a p-type layer or an n-type layer for the light receiving element 212 may be formed. In addition, a bulk transistor can be adopted in place of the thin film transistor. In that case, a semiconductor substrate can be used in place of the insulator 210.

The gate electrode 250 is formed from a single-layer or a stacked conductive layer with the use of a metal material such as molybdenum, titanium, tantalum, tungsten, aluminum, copper, neodymium, or scandium, or an alloy material which contains any of these materials as its main component.

Next, an insulating layer 252 is formed on the thin film transistor 211 and light receiving element 212. The insulating layer 252 is formed from a single layer or stacked layers with the use of a silicon oxide film or a silicon nitride film.

Then, contact holes are formed in the insulating layer 252 and the gate insulating film 251, and electrodes 253 (such as a source electrode and a drain electrode) are formed to be electrically connected to the thin film transistor 211, whereas an electrode (not shown) is formed to be electrically connected to the light receiving element 212.

The electrodes 253 and the electrode connected to the light receiving element from a single-layer or a stacked conductive layer with the use of a metal material such as aluminum, chromium, tantalum, titanium, molybdenum, or tungsten, or an alloy material which contains any of these materials as its main component.

Next, an insulating layer 254 is formed which covers the electrodes 253. It is to be noted that the insulating layer 254 is formed as a single layer or a stacked layer with the use of a silicon oxide film, a silicon nitride film, or the like.

Then, a black layer 224 is formed on the insulating layer 254 in the display section. In addition, a contact hole is formed in the insulating layer 254, and a pixel electrode 221 is formed on the insulating layer 254.

For the pixel electrode 221, a light-transmitting conductive layer can be used. In that case, the black layer 224 can be recognized through the liquid crystal element 213. The light-transmitting conductive layer can be formed from with the use of an indium tin oxide (ITO), an indium zinc oxide (IZO) in which a zinc oxide (ZnO) is mixed in an indium oxide, a conductive material in which a silicon oxide ($SiO_2$) is mixed in an indium oxide, an organic indium, organotin, an indium oxide containing a tungsten oxide, an indium zinc oxide containing a tungsten oxide, an indium oxide containing a titanium oxide, or an indium tin oxide containing a titanium oxide.

In addition, a reflective conductive layer can be used for the pixel electrode 221. In that case, an opening 225 is provided so that the underlying black layer 224 can be recognized visually from the opening 225. The reflective conductive layer can be formed with the use of one or more among from metals such as tungsten, molybdenum, zirconium, hafnium, vanadium, niobium, tantalum, chromium, cobalt, nickel, titanium, platinum, aluminum, copper, and silver, alloys thereof, and nitrides thereof. In the case of this configuration, even when light is scattered insufficiently in the liquid crystal layer 222, light can be reflected by the pixel electrode 221, and a white display is thus carried out effectively.

For example, a black organic resin can be used for the black layer 224, which can be formed by mixing a pigment-based black resin, carbon black, titanium black, or the like into a resin material such as a photosensitive or non-photosensitive polyimide. In addition, light-blocking metal films can be used which absorb light, and for example, chromium may be used.

There is no particular limitation on the method for forming the black layer 224, and a dry method such as vapor deposition, sputtering, or CVD, or a wet method such as spin coating, dip coating, spray coating, or droplet discharging (e.g., an ink jet method, screen printing, or offset printing), may be used depending on the material. If necessary, an etching method (dry etching or wet etching) may be employed to process the material into a desired pattern. In addition, in order to prevent diffusion of contaminants from the black layer 224, an overcoat layer 255 may be provided on the upper surface and lower surface of the black layer 224.

It is to be noted that one or more of other colors such as red, green, blue, cyan, magenta, and yellow may be used in place of the black layer 224 to carry out a color display. The layers which have a black color or other colors are referred to as colored layers.

Next, the spacer 214 is formed in the sensor section 202 so as to overlap with the light receiving element 212. The spacer 214 is formed in a predetermined place in accordance with a photolithography step, and also typically referred to as a photolithographic spacer, a post spacer, a pillared spacer, a columnar spacer, or a pillar spacer.

After a photosensitive organic resin layer such as acrylic or polyimide is formed by a spin coating method or a printing method over the entire surface of the substrate, a photolithography step is carried out to form a photosensitive organic resin layer on the substrate, thereby forming the spacer 214. This method can arrange the spacer in a desirable place by exposure to light, depending on the mask pattern for the exposure, thus allowing the spacer to be arranged so as to overlap with the light receiving element 212. In addition, the placement of the spacer 214 over the light receiving element can not only maintain the cell gap but also prevent the aperture ratio from being decreased. Further, the spacer 214 can be formed in such a way that a composition containing an organic insulating material is discharged by an ink-jet method and subjected to baking. In addition, the spacer 214 may be provided on an opposed substrate. In that case, an opposed substrate 257 with a common electrode 223 provided is subjected to a photolithography step to form the spacer 214.

Next, the liquid crystal layer 222 is formed with the use of a liquid crystal layer where liquid crystals are dispersed in a polymer.

As the liquid crystals, nematic liquid crystals can be used.

In addition, a light curing resin can be used as the polymer. The light curing resin may be a monofunctional monomer such as acrylate or a methacrylate; a polyfunctional monomer such as a diacrylate, a triacrylate, a dimethacrylate, or a trimethacrylate; or a mixture thereof. Furthermore, the light curing resin may have liquid crystallinity, non-liquid crystallinity, or both of them. The light curing resin can be selected appropriately depending on the wavelength with which a photopolymerization initiator to be used reacts, and an ultraviolet curable resin can be typically used.

For example, the liquid crystal layer 222 can be formed in such a way that a liquid crystal material containing liquid crystals using nematic liquid crystals, an uncured resin, and a photopolymerization initiator is irradiated for curing with light with which the light curing resin and the photopolymerization initiator react.

The photopolymerization initiator may be a radical polymerization initiator which generates radicals by light irradiation, an acid generator which generates an acid by light irradiation, or a base generator which generates a base by light irradiation.

As the method for forming the liquid crystal layer 222, a method with dispenser (dropping method), or an injection method after bonding the opposed substrate may be used.

Next, the opposed substrate 257 with the common electrode 223 provided is bonded to the insulator 210 with a sealing material interposed therebetween.

For the common electrode 223, a light-transmitting conductive material is used. For example, the common electrode 223 can be formed with the use of an indium tin oxide (ITO), an indium zinc oxide (IZO) in which a zinc oxide (ZnO) is mixed with an indium oxide, a conductive material in which a silicon oxide ($SiO_2$) is mixed with an indium oxide, organic indium, organotin, an indium oxide containing a tungsten oxide, an indium zinc oxide containing a tungsten oxide, an indium oxide containing a titanium oxide, or an indium tin oxide containing a titanium oxide. It is to be noted that the common electrode 223 may extend to the sensor section because the common electrode 223 has a light-transmitting property.

In addition, the opposed substrate 257 provided on the visual recognition side is thus formed with the use of a light-transmitting material. The light-transmitting material may be a glass substrate, a quarts substrate, a plastic substrate, etc.

This embodiment can be implemented in combination with any of the other embodiments as appropriate.

(Embodiment 3)

In this embodiment, examples of electronic devices will be described.

Figure 5A:
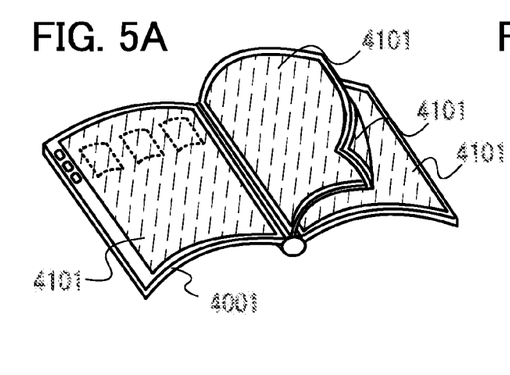
FIGS. 5A to 5F are diagrams illustrating embodiments of electronic devices.
Figure 5B:
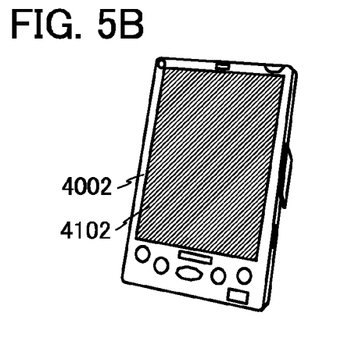

FIGS. 5A and 5B illustrate electronic papers (also referred to as electronic books, or the like). The respective uses of display devices 4101 and 4102 disclosed in this specification for main bodies 4001 and 4002 can provide electronic papers which have comparable visibility to papers and have a touch recognition function.

Figure 5C:
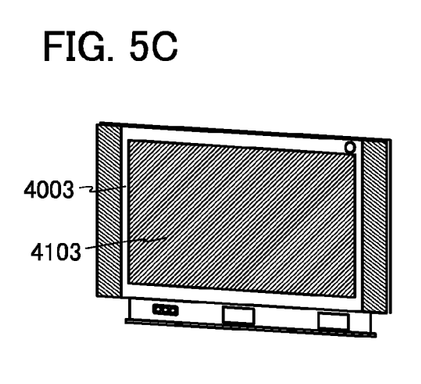
Figure 5D:
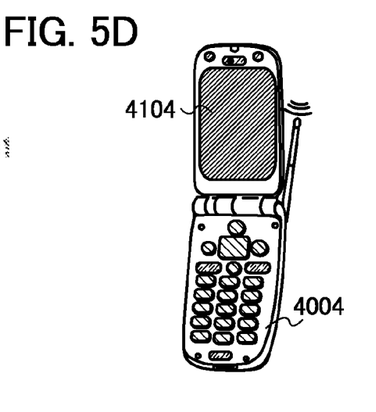
Figure 5E:
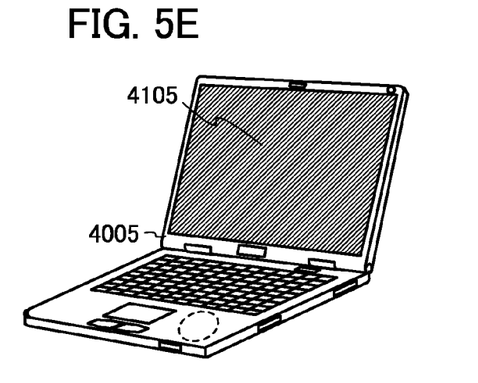
Figure 5F:
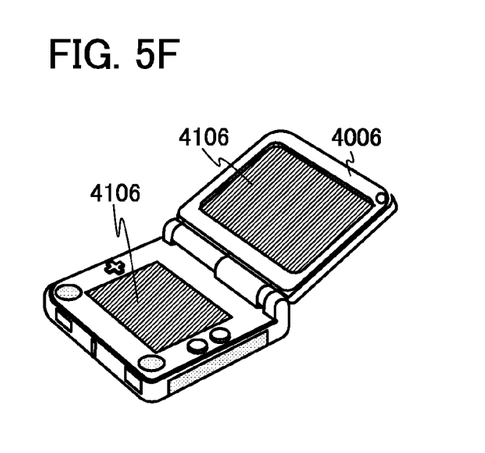

In addition, the present invention can be applied to not only electronic papers but also electronic devices such as a television illustrated in FIG. 5C, a cellular phone illustrated in FIG. 5D, a personal computer illustrated in FIG. 5E, and a game machine illustrated in FIG. 5F. The respective uses of display devices 4103 to 4106 disclosed in this specification for main bodies 4003 to 4006 can provide electronic devices which have comparable visibility to papers and have a touch recognition function.

This embodiment can be implemented in combination with any of the other embodiments as appropriate.

(Embodiment 4)

In this embodiment, an examples of electronic devices will be described.

Figure 6:
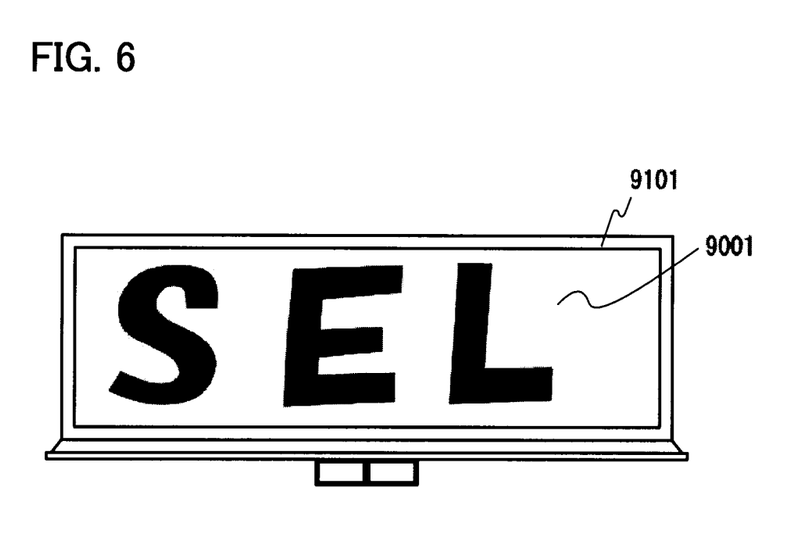
FIG. 6 is a diagram illustrating an embodiment of an electronic device.

FIG. 6 illustrates a writing board (e.g., a black board or a white board). A main body 9001 can be provided with a display device 9101 disclosed in this specification.

In this case, the surface of the display device 9101 can be freely subjected to writing with the use of a marker pen or the like.

It is to be noted that it is easy to erase letters if the letters are written with the use of a marker pen or the like containing no fixer.

In addition, the surface of the display device 9101 preferably has adequate smoothness in order to make it easier to remove the ink of marker pen.

For example, the surface of the display device 9101 has adequate smoothness if the surface has a glass substrate or the like.

Furthermore, a transparent synthetic resin sheet or the like may be attached to the surface of the display device 9101.

Preferably, acrylic, for example, is used as the synthetic resin. In this case, the surface of the synthetic resin sheet is preferably made smooth.

Moreover, while the display device 9101 displays specific images, pictures or letters can be drawn or written on the surface. Then, the display device 9101 can combine the drawn pictures or written letters with the displayed image, because the display device 9101 has a function as a scanner.

Furthermore, since a photosensor is used, sensing is possible even when time passes after drawing or writing is performed. However, when a resistive film touch sensor, a capacitance touch sensor, and the like are used, sensing can be performed only at the same time as drawing or writing.

This embodiment can be implemented in combination with any of the other embodiments as appropriate.

This application is based on Japanese Patent Application serial no. 2010-099491 filed with Japan Patent Office on Apr. 23, 2010, and Japanese Patent Application serial no. 2010-099556 filed with Japan Patent Office on Apr. 23, 2010, the entire contents of which are hereby incorporated by reference.

What is claimed is:

1. A display device comprising:
a display section comprising:
   a first portion of a first substrate;
   a first portion of an insulating layer over the first portion of the first substrate;
   a liquid crystal element over the first portion of the insulating layer; and
   a first portion of a second substrate over the liquid crystal element, and a sensor section comprising:
   a second portion of the first substrate;
   a light receiving element over the second portion of the first substrate;
   a second portion of the insulating layer over the light receiving element; and
   a spacer over the second portion of the insulating layer,
wherein the liquid crystal element comprises a first electrode, a liquid crystal layer over the first electrode, and a second electrode over the liquid crystal layer,
wherein the liquid crystal layer comprises a liquid crystal and a polymer,
wherein the liquid crystal is dispersed in the polymer,
wherein the spacer is capable of transmitting a light,
wherein the spacer and the light receiving element are overlapped with each other,
wherein the spacer comprises a region where the spacer and the liquid crystal layer are not overlapped with each other in a direction normal to a surface of the first substrate, and
wherein the liquid crystal layer is in contact with a side surface of the spacer.

2. A display device according to claim 1, wherein the spacer maintains a thickness of the liquid crystal layer.

3. A display device according to claim 1, wherein the display section comprises a coloring layer between the first portion of the insulating layer and the first electrode.

4. A display device according to claim 1,
wherein the liquid crystal layer comprises a polymer dispersed liquid crystal or a polymer network liquid crystal.

5. A display device according to claim 1, wherein the display section comprises a transistor between the first portion of the first substrate and the first portion of the insulating layer.

6. A display device according to claim 1, wherein the display section comprises a coloring layer between the first portion of the insulating layer and the first electrode and a transistor between the first portion of the first substrate and the first portion of the insulating layer.

7. A display device according to claim 1,
wherein the light receiving element is configured to detect an infra-red light.

8. A display device comprising:
a display section comprising:
   a first portion of a first substrate;
   a first portion of an insulating layer over the first portion of the first substrate;
   a liquid crystal element over the first portion of the insulating layer; and
   a first portion of a second substrate over the liquid crystal element,
and
a sensor section comprising:
   a second portion of the first substrate;

a light receiving element over the second portion of the first substrate;

a second portion of the insulating layer over the light receiving element; and a spacer over the second portion of the insulating layer, wherein the liquid crystal element comprises a first electrode, a liquid crystal layer over the first electrode, and a second electrode over the liquid crystal layer, wherein the liquid crystal layer comprises a liquid crystal and a polymer, wherein the liquid crystal is dispersed in the polymer, wherein the spacer is capable of transmitting a light, wherein the light receiving element is a vertical junction pin diode, wherein the spacer and the light receiving element are overlapped with each other, wherein the spacer comprises a region where the spacer and the liquid crystal layer are not overlapped with each other in a direction normal to a surface of the first substrate, and wherein the liquid crystal layer is in contact with a side surface of the spacer.

9. A display device according to claim 8, wherein the spacer maintains a thickness of the liquid crystal layer.

10. A display device according to claim 8, wherein the display section comprises a coloring layer between the first portion of the insulating layer and the first electrode.

11. A display device according to claim 8, wherein the liquid crystal layer comprises a polymer dispersed liquid crystal or a polymer network liquid crystal.

12. A display device according to claim 8, wherein the display section comprises a transistor between the first portion of the first substrate and the first portion of the insulating layer.

13. A display device according to claim 8, wherein the display section comprises a coloring layer between the first portion of the insulating layer and the first electrode and a transistor between the first portion of the first substrate and the first portion of the insulating layer.

14. A display device according to claim 8, wherein the spacer is in contact with a second portion of the second substrate.

15. A display device according to claim 8, wherein the display section comprises a transistor between the first portion of the first substrate and the first portion of the insulating layer, and wherein the transistor is electrically connected to the first electrode.

16. A display device according to claim 8, wherein the light receiving element is configured to detect an infra-red light.

* * * * *